Oct. 28, 1958 L. L. KEPKAY 2,858,012
VERTICAL ELEVATOR FOR HARVESTERS
Filed March 5, 1956 3 Sheets-Sheet 1

INVENTOR.
LESLIE L. KEPKAY
BY
James E. Nilles
ATTORNEY.

Oct. 28, 1958

L. L. KEPKAY 2,858,012

VERTICAL ELEVATOR FOR HARVESTERS

Filed March 5, 1956

INVENTOR.
LESLIE L. KEPKAY
BY
James E. Nilles

ATTORNEY.

Oct. 28, 1958

L. L. KEPKAY 2,858,012

VERTICAL ELEVATOR FOR HARVESTERS

Filed March 5, 1956

INVENTOR.
LESLIE L. KEPKAY
BY *James E. Nilles*

ATTORNEY.

United States Patent Office 2,858,012
Patented Oct. 28, 1958

2,858,012

VERTICAL ELEVATOR FOR HARVESTERS

Leslie L. Kepkay, Toronto, Ontario, Canada, assignor to Massey-Ferguson Inc., Racine, Wis., a corporation of Maryland Application March 5, 1956, Serial No. 569,606

1 Claim. (Cl. 198—123)

This invention relates to harvesters and is more specifically concerned with the conveying mechanism for moving the crop material from the harvesting table to another part on the harvester where the material is subsequently treated. The conveyor contemplated by this invention is of the endless undershot type and finds particular utility when used as a vertical elevator for conveying the crop from the harvester table in a rearwardly and upwardly direction to the crop treating body of the machine.

This invention is in the nature of an improvement over the device disclosed in U. S. Patent Number 2,696,290, issued December 7, 1954, and entitled "Vertical Elevator For Combines." Elevators of this type have proved efficient in use and have been widely accepted. They are capable of delivering a large volume of material in a uniform and positive manner with relatively little maintenance being required. One of the difficulties encountered with these elevators, however, as pointed out in the aforesaid patent, has been that of "carry over" of the crop material at the upper end of the conveyor. That is, instead of the crop passing from the lower flight of the conveyor to the adjacent beater, the crop tends to cling to the endless conveyor and be carried forwardly on its upper flight and it may accumulate to cause plugging of the elevator. "Wrapping" of the crop material also may occur around the rear shaft of the endless conveyor and build up around the shaft and sprockets to such an extent so as to either break the endless chain or cause it to ride off of its sprockets. This condition occurs more frequently where the growth of the crop is especially rank or a long, tough stalk is being harvested, such as in the rice fields or the flax areas.

It is therefore a general object of this invention to provide a vertical elevator for a harvester which eliminates, to a substantial degree, the above mentioned difficulties.

It is another object of the invention to provide a vertical elevator for a harvester which is efficient in operation, simple in construction and of clean design which precludes carry over, wrapping and entanglement of the crop therewith.

Other objects and advantages will become more apparent from the following detailed description, taken in conjunction, with the attached sheets of drawings in which, by way of preferred example only, is illustrated the invention.

Table

Figure 1:
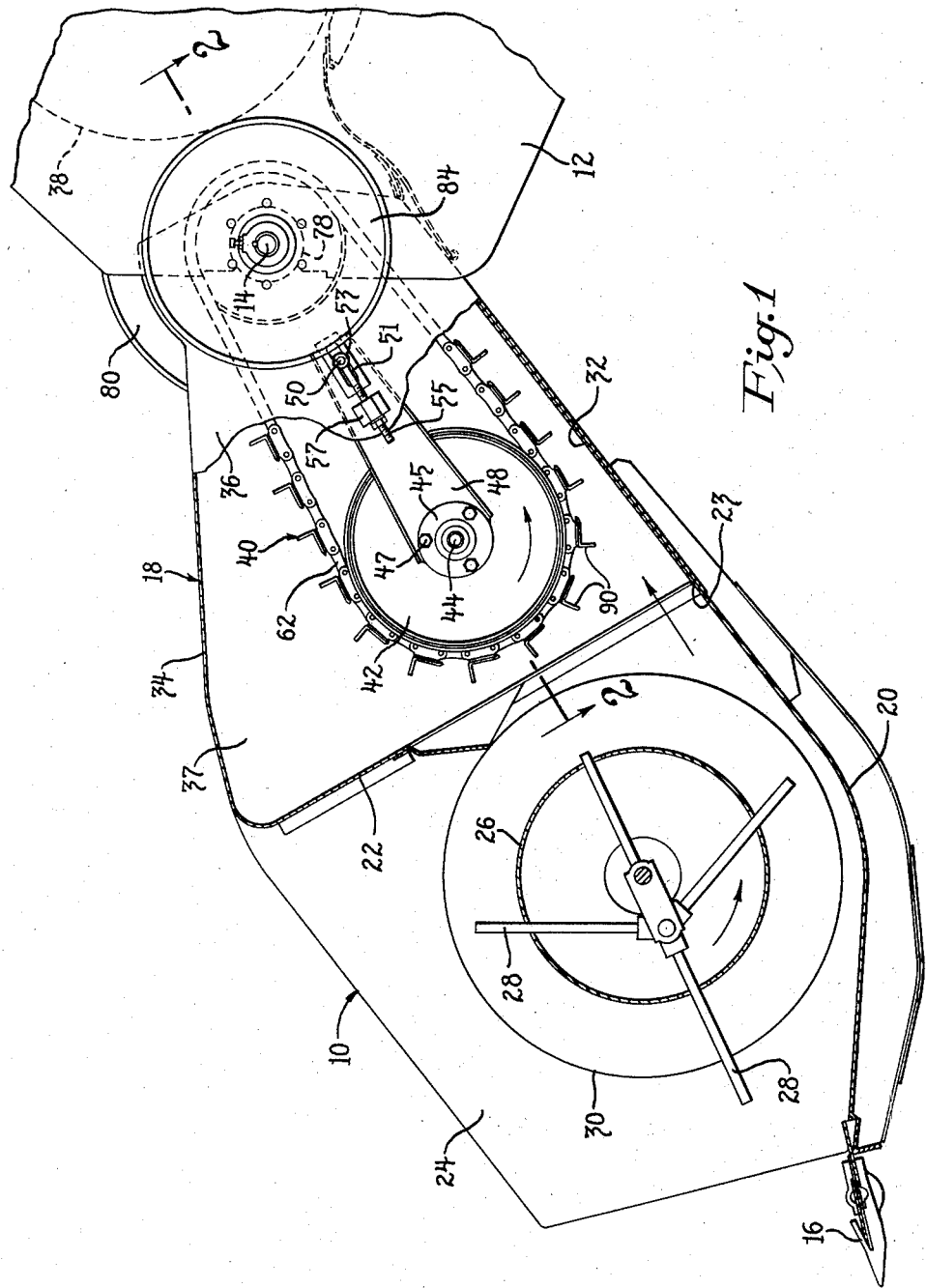
Figure 1 is a side elevational view, partially in section of a vertical elevator made in accordance with the invention.

Referring more particularly to Figure 1, a harvesting table 10 is pivotally mounted to the harvester body 12 on a transverse axis formed by the shaft 14 which permits vertical swinging of the cutting mechanism 16 which is operatively secured across the entire width of the front end of the table. The table 10, and the elevator housing 18, are conventional and a brief description will suffice for purposes of this disclosure. If a more complete description of their structure or function is desired, reference may be had to the co-pending U. S. application, Serial Number 433,781, filed June 1, 1954, entitled "Conveyor for Harvesters." The table comprises a curved bottom 20 which extends in a lateral direction from one or both sides of the housing 18. A back wall 22 extends co-extensively with the bottom 20 and is secured thereto at the juncture 23. An end wall 24 (only one shown) is secured to each end of the bottom and rear walls. The conventional lateral auger conveyor 26, having retractable fingers 28 on its portion which is located immediately in front of the elevator housing, is rotatably mounted in the end walls 24. In operation the helical screw 30 delivers the crop laterally along the rear edge of the table and to the area immediately in front of the elevator housing which is in crop receiving communication with the table. The retractable fingers 28 urge the crop rearwardly into contact with the rearwardly moving lower flight of the endless elevator to be described.

Elevator housing

The elevator housing 18 includes a bottom chute 32, a cover 34 and side walls 36, 37 which form the enclosed housing 18 and places the table 10 in crop transferring communication with the beater 38 which is located in the body 12. An endless elevator 40 of the undershot type is provided in the housing which slides the crop up the chute 32 and into the crop treating body 12 of the machine as will appear. The front end of the elevator is designed to "float" up and down, in the conventional manner, so as to accommodate the varying thicknesses of crop material passing thereunder.

Elevator

The front part of the elevator includes a large rotary member or enclosed drum 42 which is formed by an elongated cylindrical tube 43 having an end disc 43a, 43b welded at each of its sides and thereby enclosing it. A shaft 44 is secured to the drum and extends through the drum at either side thereof. The shaft is rotatably mounted at each end in anti-friction bearings 45, 46 which are secured by bolt means 47 to the forward end of their respective swinging arms 48, 49. These arms are formed from stamped sheet steel and are swingably mounted at their rear ends on a stationary shaft 50 which extends through slots 51, 52 of the side walls 36, 37 and is adjustably secured thereto by nuts 53, 54 threadably engaged on either of its ends. One end of eyebolts 55, 56 is slipped over the ends of the shaft and are secured at their other end to the brackets 57, 58, respectively, on the side walls. By adjusting the nuts 59, 60 the drum 42 can be positioned in a fore and aft direction to adjust the tautness of the flexible endless members in the form of chains 62, 63 which are trained around its periphery. This adjustment also permits assembly and disassembly of the entire elevator.

Figure 2:
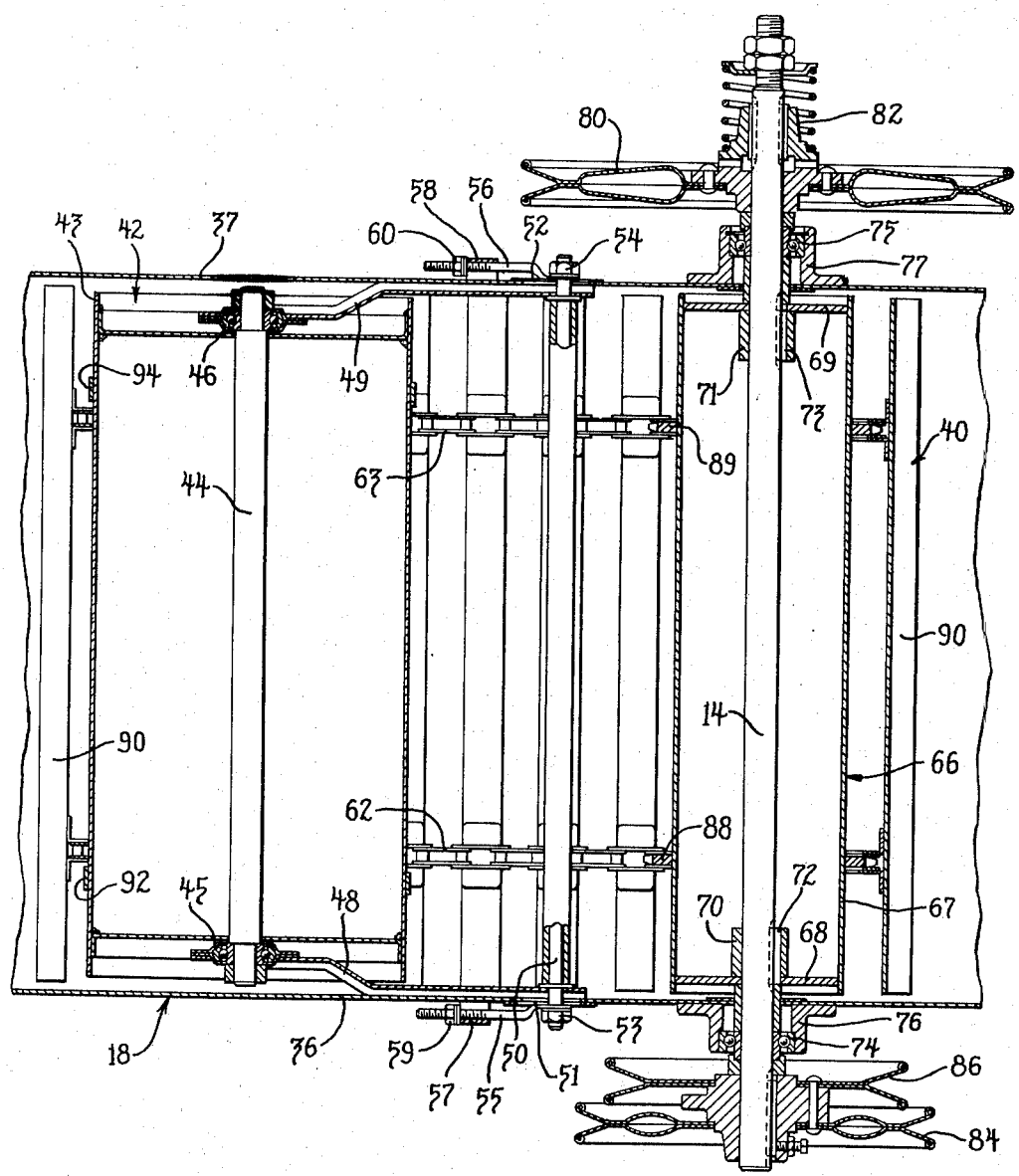
Figure 2 is a sectional view, on an enlarged scale, taken on line 2—2 of Figure 1.

The rear part of the elevator includes another elongated rotary member or drum 66 which is formed from a cylindrical sheet steel member 67 enclosed on both of its ends by the discs 68, 69 welded therein, best shown in Figure 2. A hub 70, 71 is welded to the inner sides of discs 68, 69 and the drum is secured to shaft 14 by the keys 72, 73 located between the hubs and the shaft. The shaft 14 is rotatably mounted in the anti-friction bearing 74, 75 carried by the hubs 76, 77 which in turn are secured to the side walls 36, 37. The hubs 76, 77 are rotatably secured in a socket 78 (Figure 1) carried at either side of the body 12. This socket is conventional and well known to those skilled in this art. The entire table and elevator housing can be removed from the sockets of the body 12 as a unit. Thus the table swings in a vertical direction about shaft 14 as an axis to adjust the table, or header as it is commonly referred to, relative to the ground. The shaft 14 has a large pulley 80 secured to it through which it is driven from a power source (not shown) usually an internal combustion engine mounted elsewhere on the body 12. A conventional spring loaded slip clutch 82 interrupts the drive to the shaft in case of overload or plugging of any driven parts on the table or elevator. On the other end of shaft 14 are secured two other pulleys 84, 86 which are drivingly connected to the sickle 16 and conventional reel (not shown) of the table.

Figures 3, 4:
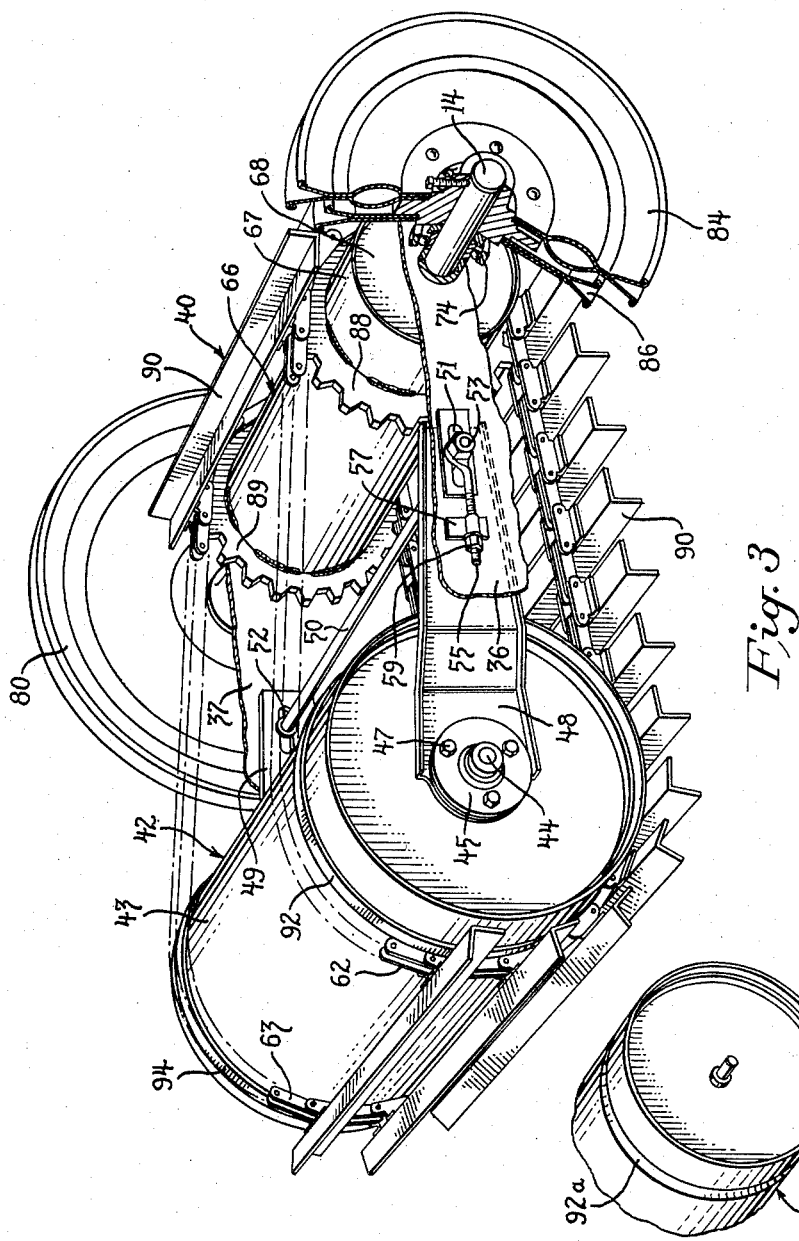
Figure 3 is a perspective view, on an enlarged scale, and with parts broken away, of the elevator shown in Figure 1, the view being taken generally from the upper, front, left side of the elevator.
Figure 4 is a fragmentary perspective view, of a modification of the front drum shown in Figure 3, but on a reduced scale.

As best shown in Figure 3, the rear rotary member 66 has welded around its periphery, at axially spaced locations, chain engaging members in the form of sprockets 88, 89 around which are engaged the endless chains 62, 63, respectively. The chains have a series of crop engaging members in the form of transversely arranged cleats 90 secured along their length. These angle iron cleats 90 serve to fasten the chains 62, 63 together and cause them to move as a single endless conveyor. The elevator must necessarily be about the same width as the elevator housing so as to insure the housing is swept clean and no crop material is given a chance to hesitate in its travel and thereby encourage an accumulation of material. It is therefore necessary to be sure that the elevator is kept centered in the housing to prevent the ends of the cleats 90 from scraping against the inner sides of the side walls. For this purpose guide portions in the form of strips 92, 94 are welded at axially spaced locations around the periphery of front drum 42 as shown in Figures 1 to 3. These guide portions may take other forms such as shown in the modification of Figure 4 where they are formed as grooves 92a extending around the drum periphery. Guide members 92, 94 are located on the outer sides of the chains and, when the chains have been made taut, they preclude shifting of the chains in an axial direction on the drum.

It will be noted that the design of the front and rear rotary members is clean and free of obstructions, giving the crop material little opportunity to catch and thereby wind about or otherwise accumulate. The rear drum is sufficiently large to discourage material from wrapping around it and the beater 38 then readily strips the material therefrom.

The large front drum presents a smooth surface to the incoming crop material and acts to flatten the material down and roll it under the conveyor.

With this improved elevator the need for plates between the upper and lower runs of the chains and various shields for the sprockets and shafts is eliminated.

I claim:

In a harvester having a harvesting table spaced from the harvester body, an endless undershot type conveyor for moving crop material from said table to said body, comprising, in combination, an elongated chute having a bottom and opposed side walls extending from the harvesting table to the harvester body, a front cylindrical drum rotatably mounted on a shaft in the crop receiving opening at the table end of said chute, a rear cylindrical drum rotatably mounted at the body end of said chute, a pair of spaced sprocket rings, secured to the outer surface of said rear drum, a pair of endless flexible members trained respectively about said sprocket rings and said front cylindrical drum, guide surfaces formed on said front drum for holding said flexible members in alignment with their respective sprocket rings, a series of crop-engaging members extending between said chute side walls and carried by said flexible members, and means for rotating said rear drum, said front drum extending across the chute and being of sufficient diameter to effectively block said crop receiving opening and thus wedge crop material delivered thereto down onto the chute bottom, and said shaft being supported for vertical movement so that said front drum may float up from said chute bottom to open said crop receiving opening and permit the crop material wedged downwardly by the drum to be drawn along the chute body by said crop engaging members.

References Cited in the file of this patent

UNITED STATES PATENTS

| 603,945 | Edgerton | May 10, 1898 |
| 2,368,414 | Eggleston | Jan. 30, 1945 |
| 2,696,290 | Carroll | Dec. 7, 1954 |

FOREIGN PATENTS

| 440,668 | Great Britain | Jan. 3, 1936 |
| 672,425 | Germany | Mar. 2, 1939 |
| 153,381 | Australia | Sept. 24, 1953 |